United States Patent
Junior et al.

(10) Patent No.: US 9,976,567 B2
(45) Date of Patent: May 22, 2018

(54) ROTOR OF AN EXTRACTOR-FAN ASSEMBLY FOR AGRICULTURAL MACHINES

(71) Applicant: Marchesan Implementos e Maquinas Agricolas Tatu S.A., Matao (BR)

(72) Inventors: Dacio Helene Junior, Varginha (BR); Valter Palmute, Araras (BR)

(73) Assignee: MARCHESAN IMPLEMENTOS E MAQUINAS AGRICOLAS TATU S.A., Matao—SP (BR)

( * ) Notice: Subject to any disclaimer, the term of this patent is extended or adjusted under 35 U.S.C. 154(b) by 64 days.

(21) Appl. No.: 14/772,000

(22) PCT Filed: Dec. 10, 2014

(86) PCT No.: PCT/BR2014/050037
§ 371 (c)(1),
(2) Date: Sep. 1, 2015

(87) PCT Pub. No.: WO2016/004490
PCT Pub. Date: Jan. 14, 2016

(65) Prior Publication Data
US 2017/0108000 A1   Apr. 20, 2017

(30) Foreign Application Priority Data

Jul. 11, 2014   (BR) .............................. 102014017202

(51) Int. Cl.
*F04D 29/38*   (2006.01)
*A01D 45/10*   (2006.01)

(52) U.S. Cl.
CPC ........... *F04D 29/384* (2013.01); *A01D 45/10* (2013.01)

(58) Field of Classification Search
CPC ...... F04D 29/384; F04D 29/386; F04D 19/02; F04D 29/38; A01D 45/10; Y10S 416/02; Y10S 416/05
See application file for complete search history.

(56) References Cited

U.S. PATENT DOCUMENTS

| | | | |
|---|---|---|---|
| 4,155,602 A | | 5/1979 | Quick |
| 5,112,192 A | * | 5/1992 | Weetman ............ B01F 7/00341 366/325.4 |

(Continued)

FOREIGN PATENT DOCUMENTS

| | | |
|---|---|---|
| AU | 422586 B2 | 3/1972 |
| BR | PI0302278-1 A | 3/2005 |

(Continued)

OTHER PUBLICATIONS

International Searching Authority, International Search Report and Written Opinion for International Application No. PCT/BR2014/050037, dated Apr. 1, 2015, 10 pages, European Patent Office, The Netherlands.

(Continued)

*Primary Examiner* — Dwayne J White
*Assistant Examiner* — Peter T Hrubiec
(74) *Attorney, Agent, or Firm* — Alston & Bird LLP

(57) ABSTRACT

The present invention relates to a rotor (90) applied to an extractor-fan assembly (80) for agricultural machines, especially for sugar-cane harvesters, the rotor (90) comprising a set of blades (1) fixed to a hub (2). Each of the blades (1) has such a construction that defines a root angle (3) that may range from 47 to 59 degrees, a medium angle (4) that may range from 53 to 69 degrees and a trailing angle (5) that may range from 66 to 78 degrees. Due to the construction angles of the blades (1), the air flow comes in contact with the rotor (9) smoothly, without any turbulence in its displacement, (Continued)

which results in high efficiency and efficacy of the extractor-fan assembly (80).

8 Claims, 5 Drawing Sheets

(56) References Cited

U.S. PATENT DOCUMENTS

| | | | |
|---|---|---|---|
| 6,869,356 B2 | 3/2005 | Hinds | |
| 2004/0258530 A1* | 12/2004 | Oono | F04D 29/164 416/223 R |
| 2015/0071786 A1* | 3/2015 | Kumon | F04D 29/384 416/223 R |

FOREIGN PATENT DOCUMENTS

| | | |
|---|---|---|
| BR | PI1104385-7 A2 | 11/2013 |
| EP | 0493342 A1 | 7/1992 |
| GB | 502704 A | 3/1939 |

OTHER PUBLICATIONS

Churchward, E.H., et al., "Some Economic Aspects of Mechanical Cane Harvesting in Queensland", Proceedings of the Australian Society of Sugarcane Technologists 39$^{th}$ Conference, Apr. 12-18, 1972, pp. 31-38, Bundaberg.

* cited by examiner

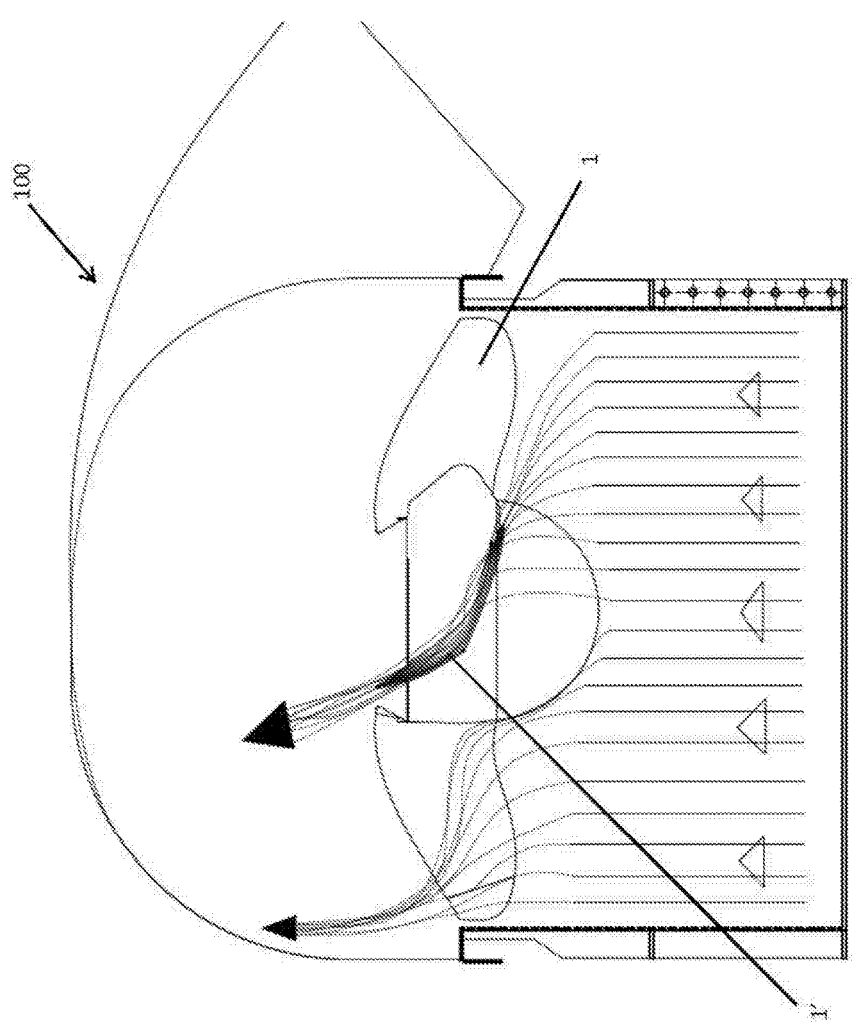

ROTOR OF AN EXTRACTOR-FAN ASSEMBLY FOR AGRICULTURAL MACHINES

CROSS REFERENCE TO RELATED APPLICATIONS

This application is a national stage application, filed under 35 U.S.C. § 371, of International Application No. PCT/BR2014/050037, filed Dec. 10, 2014, which claims priority to Brazilian Patent Application No. 102014017202-5, filed Jul. 11, 2014, the contents of both of which as are hereby incorporated by reference in their entirety.

BACKGROUND

Technical Field

The present invention relates to a rotor applied to an extractor-fan assembly for agricultural machines, especially for sugar-cane harvesters, the rotor comprising a set of blades fixed to a hub, defining medium and trailing root angles, which facilitate displacement of air along the blades.

Description of Related Art

The extractor-fan assembly used on agricultural machines and more specifically on sugar-cane harvesters comprises a metallic cap which houses a rotor, a central axle, a hub and a set of blades.

The extractor-fan assembly is responsible for cleaning the harvested material, separating trash and earth from sugar-cane billets and also responsible for distributing the trash and earth over the ground surface.

The set of blades of the extractor-fan assembly is responsible for displacing the air flow that carries impurities, by turning the rotor. The displacement of air results in higher or lower efficacy of the extractor-fan assembly.

Constructions for the blades of the extractor-fan assembly used on sugar-cane harvesters are known from the prior art, as for example, the construction described in U.S. Pat. No. 4,155,602, which relates to a blade of an extractor-fan assembly having three straight profiles comprising a central portion, a leading portion and a trailing portion. These straight profiles cause greater turbulence in the air.

U.S. Pat. No. 6,869,356 and PI1104385-7 describe blades applied to extractor fans with two straight profiles, either folded or inclined to each other, one profile being intended for exit of air and the other profile being integral with the blade body.

Further, as a prior-art document, one can cite PI0302278-1, which describes a blade with a profile grooved in only one direction. This grooved profile, in spite of providing good displacement of air, is deficient in both entry of air, due to the lack of trailing angle, and ion exit of air due to the lack of trailing angle.

The need for high power for driving the extractor-fan assembly due to its inefficiency, as can be observed on conventional harvesters, implies directly greater consumption of fuel (diesel), higher operational cost and greater environmental impact due to larger emission of gases by harvester engines.

Moreover, studies carried out by Churchward and Belcher (1972), entitled: "Some economic aspects of mechanical cane harvesting in Queensland, Proc. Qd Soc. Sugar Cane Technol. 39th Conf. 31-38", showed that each extractor-fan assembly of prior-art sugar-cane harvesters consume about 60 HP for efficiently cleaning the harvested cane. It should be reminded that the great majority of harvesters use two extractor-fan assemblies, the consumed power corresponding to 120 HP.

The new configuration proposed in this specification, enables the harvesters to carry out their work with only one extractor-fan assembly per machine, generating a consumption of 30 HP, saving diesel and consequently reducing the harvesting operation cost.

BRIEF SUMMARY

The objective of the present invention is to conceive and describe a rotor comprising a set of blades fixed to the hub of an extractor-fan assembly for agricultural machines, especially sugar-cane harvesters, positioning each of the blades with respect to the hub, so as to generate an a root angle, a medium angle and a trailing angle, which decrease turbulence and increases the intensity of displacement of air flow of the extractor-fan assembly. These combined characteristics of the blades result in a significant reduction of the demand for power by the new extractor-fan assembly, due to its great efficiency.

The present invention has the objective of providing a rotor of an extractor-fan assembly for agricultural machines, the rotor comprising a set of blades fixed to a hub and extending radially with respect to the hub, the hub being provided with a longitudinal axis.

Each of the blades of the set, when seen in top view, defines a root line that is tangent to a blade end, the trailing line being opposite the root line, and a medium line located half-way between the root line and the trailing line.

Further, each of the blades, when drawn in profile in front view with a longitudinal axis of the hub, exhibits such a construction that the intersection of the root line with the longitudinal axis defines a root angle that may range from 47 to 59 degrees and the intersection of the trailing line with the longitudinal axis defines a trailing angle that may range from 66 to 78 degrees.

The profile of each of the blades of the set is formed by combining conformed strokes, in both longitudinal and transverse direction of the blade, besides defining a tapering leading edge.

BRIEF DESCRIPTION OF THE FIGURES

The rotor of an extractor-fan assembly for agricultural machines can be better understood with reference to the detailed description, which is based on the figures below:

FIG. 10 is a side view of the generic extractor-fan assembly provided with a set of blades, representing the displacement of air flow along a blade.

DETAILED DESCRIPTION OF VARIOUS EMBODIMENTS

Figure 1:
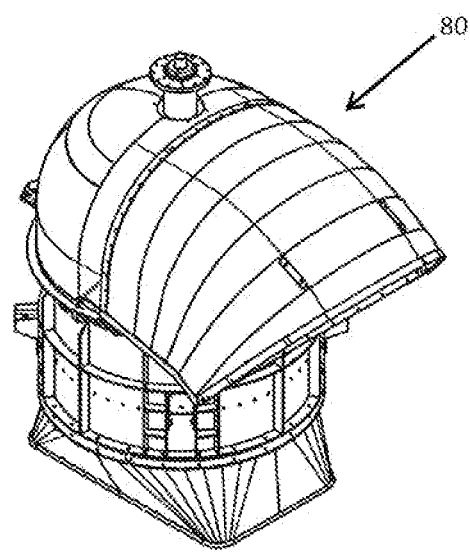
FIG. 1 is a schematic view of the extractor-fan assembly.

In FIG. 1, one represents the extractor-fan assembly 80 used on agricultural machines, especially sugar-cane harvesters.

Figures 2, 3:
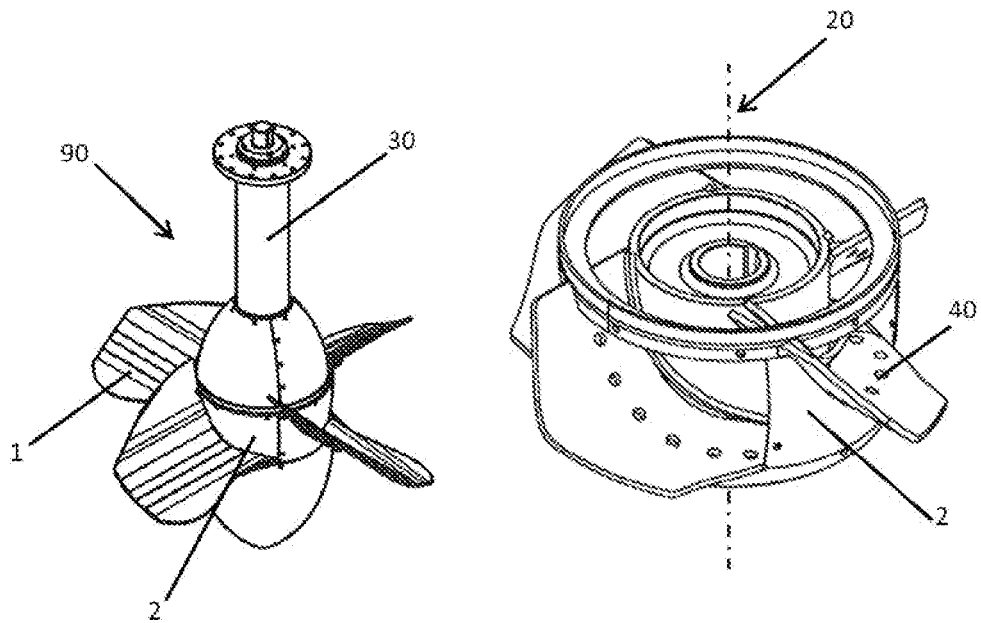
FIG. 2 is a schematic view of the rotor of the extractor-fan assembly.
FIG. 3 is a schematic view of the hub of the rotor of the extractor-fan assembly.

Inside the extractor-fan assembly 80, there is a rotor 90, which comprises a central axle 30, a hub 2 and a set of blades 1, as shown in FIG. 2.

In FIG. 3, the hub 2 of the rotor 90 is represented together with the supports 40, to which the set of blades 1 is fixed. One can also observe the representation of the longitudinal axis 20 of the hub 2.

Figure 4:
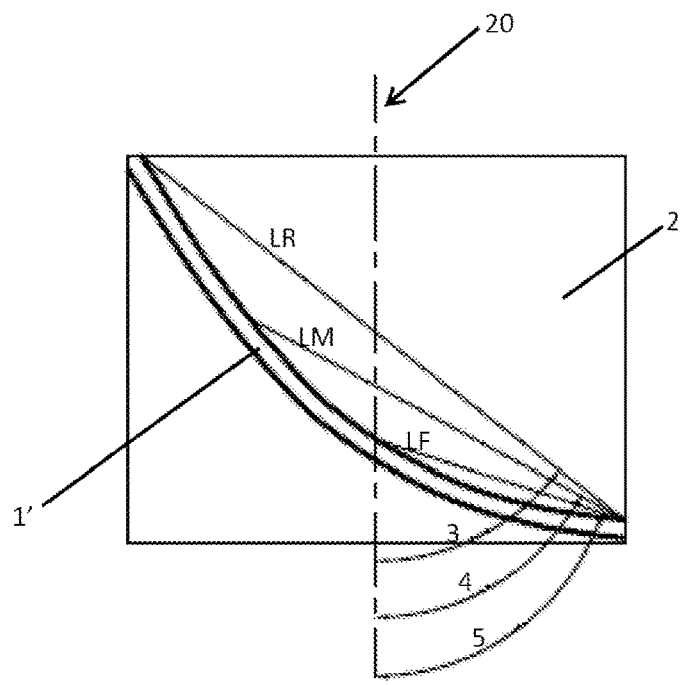
FIG. 4 is a front view of the blade profile with the blade fixed to the hub, representing the root angle, the medium angle and the trailing angle with respect to the longitudinal axis of the hub.

The front view shown in FIG. 4 shows the profile 1' of each of the blades 1 and contains the longitudinal axis 20 of the hub 2. Each of the blades 1 has such a construction that the intersection of the root line LR with the longitudinal axis 20 defines a root angle 3 of 53 degrees and may range from 47 to 59 degrees, the intersection of the medium line LM with the longitudinal axis 20 defines a medium angle 4 or a leading angle of 61 degrees and may range from 53 to 69 degrees, and the intersection of the trailing line LF with the longitudinal axis 20 defines a trailing angle 5 or an exit angle of 72 degrees and may range from 66 to 78 degrees.

Figure 5:
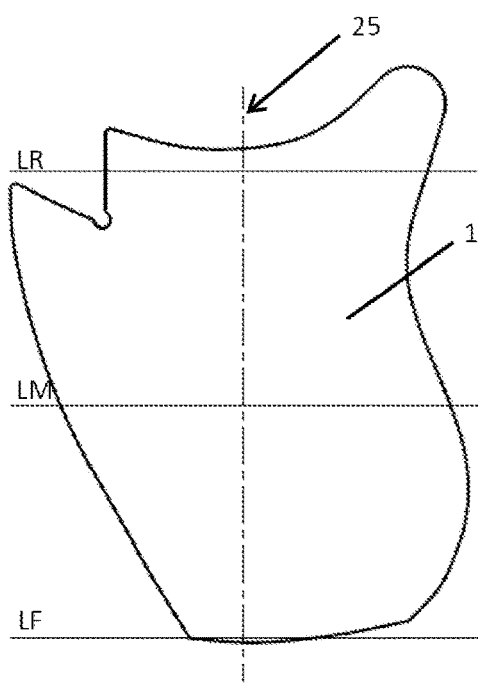
FIG. 5 is a top plan view of the blade, with representation of the root, the medium line and the trailing line.

The top view shown in FIG. 5 projects each of the blades 1 and contains the transverse axis 25 of the hub 2. Defined on each of the blades 1 are: a root line LR tangent to the hub 2, a trailing line LF tangent to an end of the blade 1, the trailing line LF being opposite the root line LR, and a medium line LM located half-way between the root line and the trailing line LF.

The transverse axis 25 is perpendicular to the longitudinal axis 20 of the hub 2, as shown in FIGS. 4 and 5.

Figure 6:
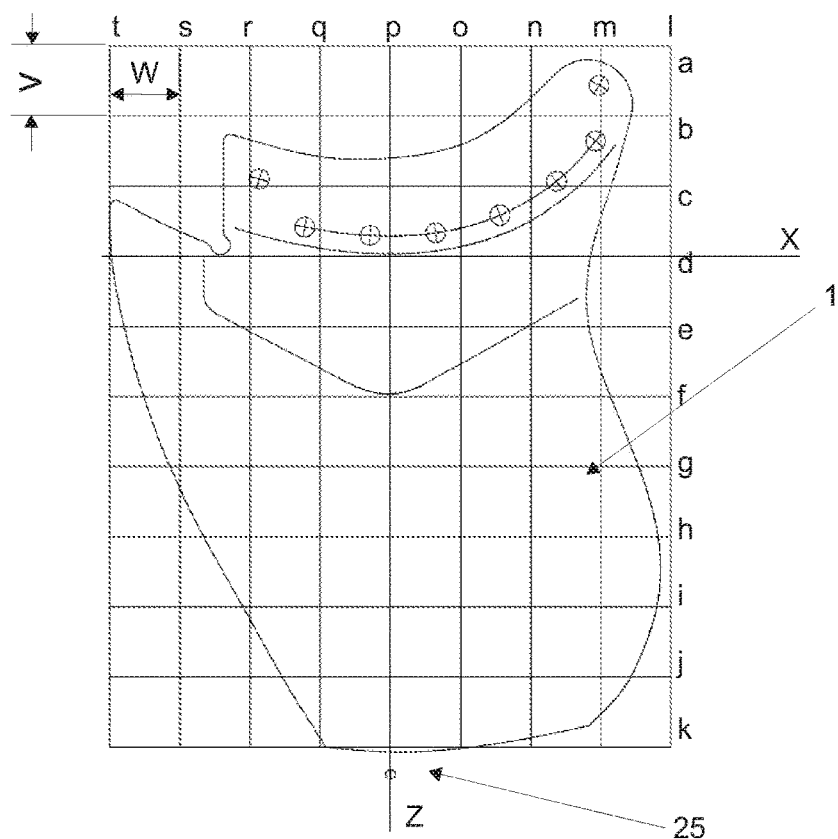
FIG. 6 is a top view of the blade, with representation of a mesh with horizontal and vertical spacing, with the horizontal lines defining cutting profiles of the blade.

In FIG. 6, the blade 1 is represented in a top view, on the axis x and z, the z axis being the transverse axis 25 of the hub 2.

Besides, FIG. 6 shows a mash with horizontal W 5-mm divisions and vertical V 50-mm divisions, in which the horizontal lines represent cutting profiles a, b, c, d, e, f g, h, l, j, k of the blade 1.

Figure 7:
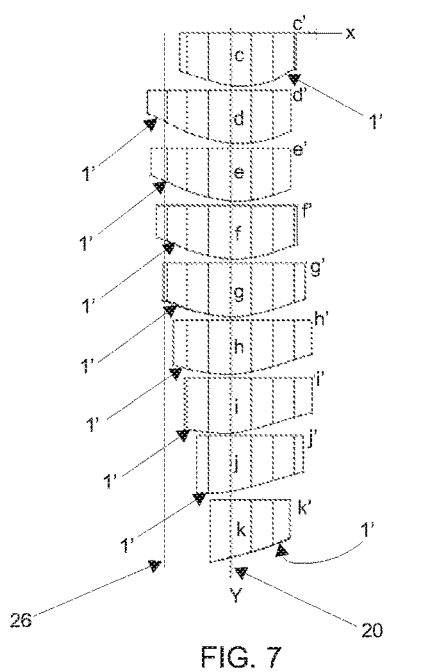
FIG. 7 is a front view of the cutting profiles of the blade.

One can observe the cutting profiles c, d, e, f, g, h, l, j, k in FIG. 7, in a front view of the blade, on axis x and y, the y axis being the longitudinal axis 20 of the hub 2.

The cutting profiles c, d, e, f, g, h, l j, k have the objective of showing the profile 1' of the blade 1 in its final state, after conformation, with respect to its measurement base lines c', d', e', f', g', h', i', ', k', which represent the null height (0 mm) of the axis y, which is concentric to the longitudinal axis 20.

The cutting profiles a, b are not shown in FIG. 7, since they are regions of fixation of the blade 1 to the hub 2.

FIG. 7 further shows a reference line 26 used in the construction of the cutting profiles c, d, e, f, g, h, l, j, k.

Figure 8:
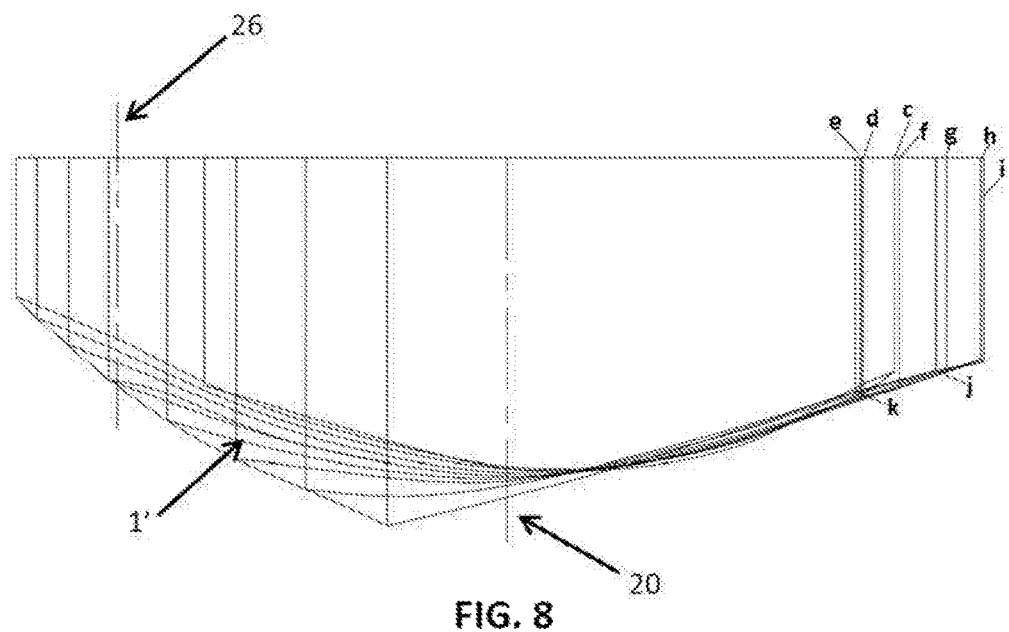
FIG. 8 is a front view of the final profile of the blade, formed by joining the cutting profiles.

It is possible to observe the union of the cutting profiles c, e, e, f, g, h, l, j, k forming the final profile 1' of the blade 1, as a combination of conformed strokes, as shown in FIG. 8.

Figure 9:
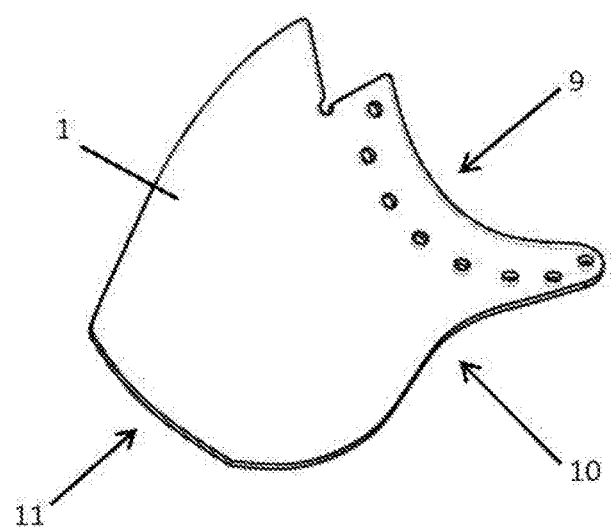
FIG. 9 is an isomeric view of the blade, representing the root edge, the leading edge and the trailing edge.

The blade 1 can be better observed in FIG. 9, in an isomeric view, in which the root edge 9, the attach edge 10 and the trailing edge 11 are represented.

One can notice that the leading edge 10 has a tapering profile, resulting in a blade 1 with the active leading edge.

As can be seen, FIG. 10 represents the positioning of the final profile 1' of the blade 1 with respect to the generic extractor-fan assembly, defining the displacement of air flow along the blade 1.

Each of the blades 1 is screwed onto a support 40 of the hub 2 of the extractor-fan assembly 80, being moved by the central axle 30 that drives the extractor-fan assembly 80. The rotor 90 describes a circular turn in clockwise direction, this direction ensuring that the attach edge 10 of each of the blades 1 will be represented by the medium angle 4 or the leading angle. The extractor-fan assembly 80 sucks air from a compartment of the agricultural machine, in this case a sugar-cane harvester, delimited between the chopping assembly and the cane-billet lifter.

During the harvesting operation, the sugar-cane, together with the vegetable and mineral impurities, passes through the chopping assembly, then is launched into the cleaning chamber of the extractor-fan assembly 80. In order to remove the impurities from the harvested canes, the blades 1 of the extractor-fan assembly 80 perform two functions.

The first function of the blade 1 is to displace air with impurities that is in contact with or close to the hub 2 of the extractor-fan assembly 80. The combination of the root angle 3 with the medium angle 4 or the attach angle of the blade 1 causes the air containing impurities to be carried smoothly as far as the trailing angle 5 or the exit angle at the trailing edge 11.

The second function of the blade 1 is to displace the air with impurities that is farther away from the center of the extractor-fan assembly 80. The attach edge 10 of the blade 1 embraces the air containing impurities that flows throughout the extent of the body of the blade 1 smoothly and then is expelled through the trailing angle 5 or exit angle at the trailing edge 11.

Due to the smoothness with which the air flow comes in contact with the blade 1, no turbulence is caused in its displacement, which results in high efficiency and efficacy of the extractor-fan assembly 80 and guarantees quality of cleaner harvested sugar-cane. The extractor-fan assembly 80 also requires lower power for its operation, thus reducing the harvesting cost and environmental impacts.

A preferred example of embodiment having been described, one should understand that the scope of the present invention embraces other possible varieties, being limited only by the contents of the accompanying claims, which include the possible equivalents.

The invention claimed is:

1. A rotor (90) of an extractor-fan assembly (80) for agricultural machines, the rotor (90) comprising:
   a hub (2) having a longitudinal axis (20) and a transverse axis (25); and
   a set of blades (1) fixed to the hub (2) and extending radially with respect to the hub (2),
   wherein:
     each blade (1) within the set of blades (1), when drawn in plan in a top view, defines:
       a root line (LR) tangent to the hub (2);
       a trailing line (LF) tangent to an end of the blade (1), the trailing line (LF) being opposite the root line (LR);
       a medium line (LM) located half-way between the root line (LR) and the trailing line (LR); and
       a leading edge (10) having a concave portion and a convex portion, the concave and convex portions being defined relative to the transverse axis (25) of the hub (2), the concave portion having an end point between the root line (LR) and the medium line (LM), the convex portion extending from the end point of the concave portion, through the medium line (LM) and to an end point substantially adjacent the trailing line (LF);

a trailing edge that extends from the end of the blade (1) to a point spaced apart from the root line (LR) and intermediate the end of the blade (1) and the root line (LR); and each blade (1) within the set of blades (1), when drawn in profile in a front view containing the longitudinal axis (20) of the hub (2), exhibits such a construction that:

an intersection of the root line (LR) with the longitudinal axis (20) defines a root angle (3) in a range from 47 to 59 degrees;

an intersection of the medium line (LM) with the longitudinal axis (20) defines a medium angle (4) in a range from 53 to 69 degrees; and an intersection of the trailing line (LF) with the longitudinal axis (20) defines a trailing angle (5) in a range from 66 to 78 degrees.

2. The rotor according to claim 1, wherein:
the root angle (3) is 53 degrees;
the medium angle (4) is 61 degrees; and
the trailing angle (5) is 72 degrees.

3. The rotor according to claim 1, wherein each blade (1) within the set of blades (1) comprises a tapering leading edge (10).

4. The rotor according to claim 1, wherein:
each blade (1) within the set of blades (1) further comprises an edge opposite the leading edge (10) relative to the transverse axis (25) of the hub (2); and
the opposite edge defines a convex portion extending continuously, relative to the transverse axis, between the root line (LR) and the trailing line (LF).

5. A rotor (90) of an extractor-fan assembly (80) for agricultural machines, the rotor (90) comprising:
a hub (2) having a longitudinal axis (20) and a transverse axis (25); and
a set of blades (1) fixed to the hub (2) and extending radially with respect to the hub (2),
wherein:
each blade (1) within the set of blades (1), when drawn in plan in a top view, defines:
a root line (LR) tangent to the hub (2);
a trailing line (LF) tangent to an end of the blade (1), the trailing line (LF) being opposite the root line (LR);
a medium line (LM) located half-way between the root line (LR) and the trailing line (LR); and
a leading edge (10) having equal and opposing curvatures, a concave portion and a convex portion, the concave and convex portions being defined relative to the transverse axis (25) of the hub (2), the concave portion having an end point between the root line (LR) and the medium line (LM), the convex portion extending from the end point of the concave portion, through the medium line (LM) and to an end point substantially adjacent the trailing line (LF); and each blade (1) within the set of blades (1), when drawn in profile in a front view containing the longitudinal axis (20) of the hub (2), exhibits such a construction that:

an intersection of the root line (LR) with the longitudinal axis (20) defines a root angle (3) in a range from 47 to 59 degrees;

an intersection of the medium line (LM) with the longitudinal axis (20) defines a medium angle (4) in a range from 53 to 69 degrees; and an intersection of the trailing line (LF) with the longitudinal axis (20) defines a trailing angle (5) in a range from 66 to 78 degrees.

6. The rotor according to claim 5, wherein:
the root angle (3) is 53 degrees;
the medium angle (4) is 61 degrees; and
the trailing angle (5) is 72 degrees.

7. The rotor according to claim 5, wherein each blade (1) within the set of blades (1) comprises a tapering leading edge (10).

8. The rotor according to claim 5, wherein:
each blade (1) within the set of blades (1) further comprises an edge opposite the leading edge (10) relative to the transverse axis (25) of the hub (2); and
the opposite edge defines a convex portion extending continuously, relative to the transverse axis, between the root line (LR) and the trailing line (LF).

* * * * *